Oct. 7, 1969    N. O. ROSAEN    3,471,023
PLEATED FILTER CONSTRUCTION
Filed Aug. 7, 1967    2 Sheets-Sheet 2
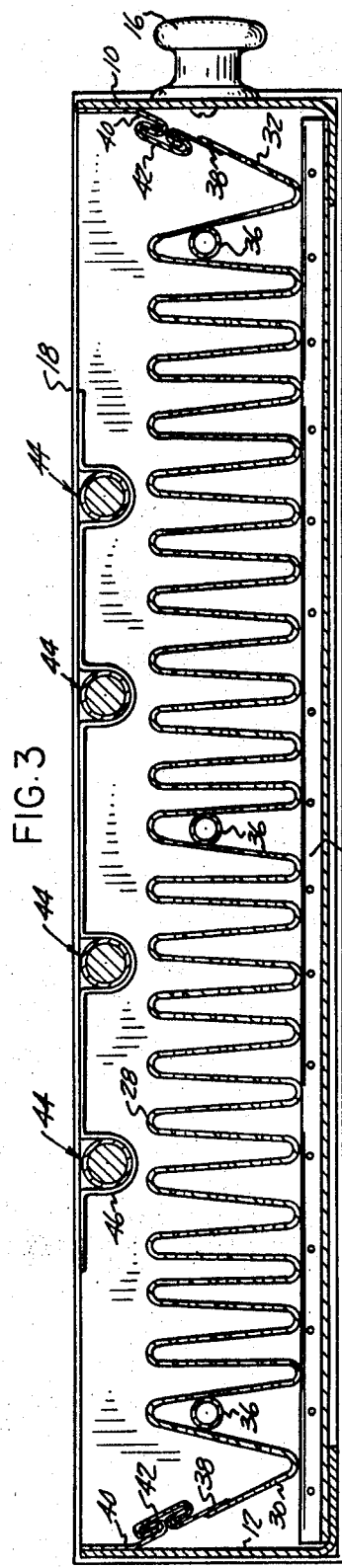
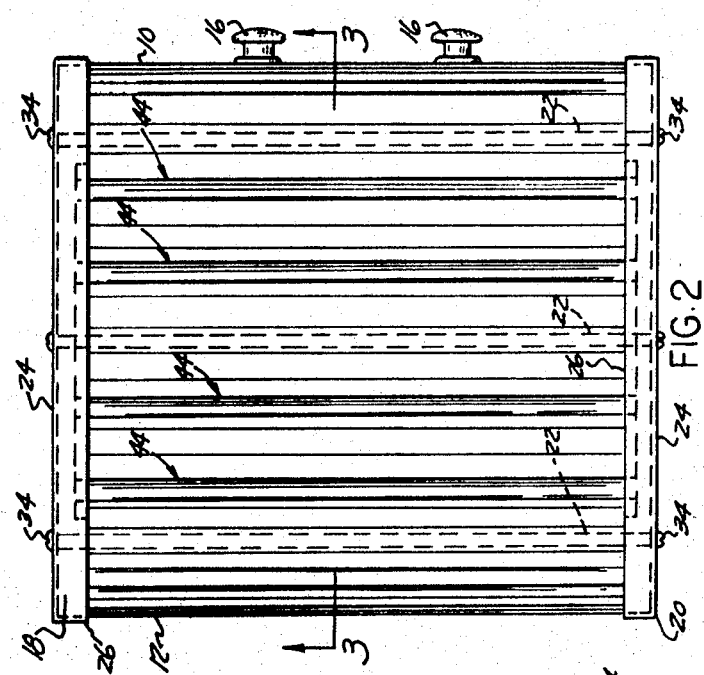
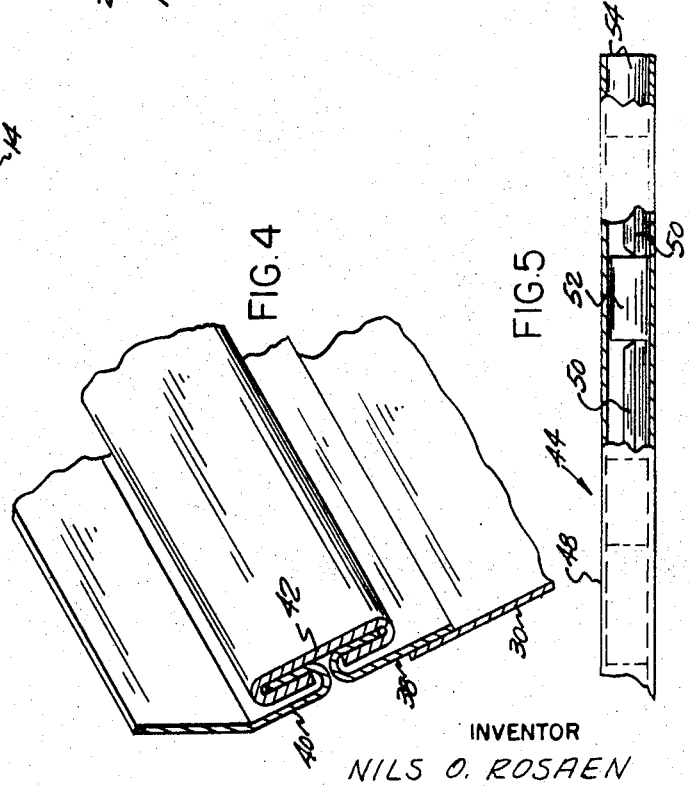
INVENTOR
NILS O. ROSAEN
BY
ATTORNEYS

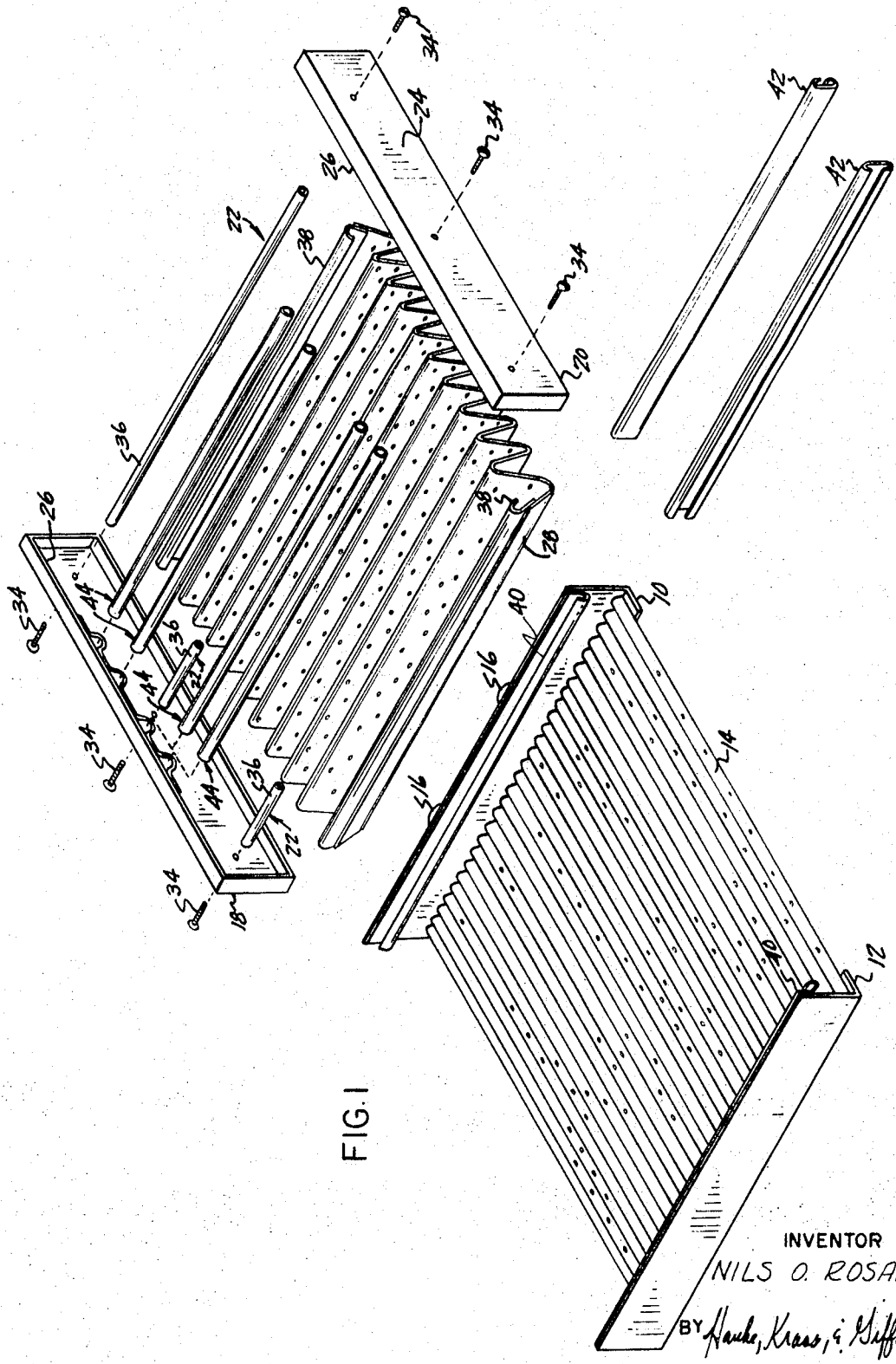
FIG. I

United States Patent Office 3,471,023
Patented Oct. 7, 1969

3,471,023
PLEATED FILTER CONSTRUCTION
Nils Ol Rosaen, Bloomfield Hills, Mich., assignor, by mesne assignments, to Parker-Hannifin Corporation, Cleveland, Ohio, a corporation of Ohio
Filed Aug. 7, 1967, Ser. No. 658,704
Int. Cl. B03c 7/04; B01d 35/06
U.S. Cl. 210—223      8 Claims

ABSTRACT OF THE DISCLOSURE

A pleated filter element having an elongated J-shaped clip carried along a pair of opposite side edges is removably mounted within a four-sided frame having a companion elongated J-shaped clip along a pair of opposed frame sides by a pair of elongated C-shaped clips, each of which provides a separable connection between each pair of companion J-shaped clips.

BACKGROUND OF THE INVENTION

Field of the invention

This invention relates to a fluid filter element and more particularly to a filter construction including a pleated filter sheet removably mounted to a perimetrical frame by interengaging clips.

Description of the prior art

Pleated filter elements of the type employing a fine mesh wire cloth supported in a perimetrical frame are widely employed in industrial applications as a means for removing foreign matter from fluid systems. This is because pleated filter construction increases the filtering area in the path of the moving fluid. One type of pleated filter employs a fine mesh wire cloth which satisfactorily strains out the foreign matter. It has been found that when the pleated element become clogged it can be cleaned much more rapidly and satisfactorily if it is first separated from its supporting frame to permit the pleats to be unfolded.

The broad purpose of the present invention is to provide an improved means for removably attaching a wire cloth filter element to a supporting frame.

SUMMARY OF THE PRESENT INVENTION

The preferred embodiment of the present invention, which will be subsequently described in greater detail, takes the form of a four-sided frame comprising a pair of sides fixed to opposite sides of a corrugated perforated supporting plate and a second pair of sides which are removably engaged with the ends of the fixed frame sides. The removable sides preferably are cap-shaped with their ends forming sockets for receiving the ends of the fixed sides.

An elongated clip having a J-shaped cross section is carried on the inner surface of each of the fixed sides. A filter sheet preferably formed of a fine mesh wire cloth with a pleated configuration extending between a pair of opposite side edges carries a second pair of elongated clips having a J-shaped cross-section on the side edges parallel to the pleats. The J-shaped clips of the filter element are disposed adjacent the J-shaped clips of the frame sides with each companion pair of clips being engaged by an elongated clip having a C-shaped cross-section.

Novel magnet means in the form of a series of frame-supported tubular members each carrying a series of small magnets separated by non-magnetic spacers provide means for removing magnetically attractive foreign matter from the fluid system in which the preferred filter is disposed.

The partially collapsible frame provides rigid means for supporting the filter element when it is actively employed as a filtering means in a fluid system and in addition permits the filter element to be easily separated from the frame by disengaging the clip means so that the pleats can be cleaned.

It is therefore an object of the present invention to provide an improved construction for a fluid filter cartridge having a porous filter sheet mounted on a supporting frame by providing a first elongated clip having a J-shaped cross section which is attached to the frame, a second elongated clip having a J-shaped cross section attached to a side edge of the filter sheet and an elongated retainer member having a C-shaped cross section for slidably engaging the J-shaped clips.

Still another object of the present invention is to provide an improved filter construction for a pleated filter with a partially collapsible frame permitting the filter sheet to be removably mounted upon the frame by novel clips means.

A still further object of the present invention is to improve filter elements for separating magnetically attractive foreign particles from a fluid system which comprises a tubular retainer mounted on the filter frame with a series of magnets disposed within the tubular retainer and separated from one another by spacer elements.

Still further objects and advantages of the present invention will readily occur to one skilled in the art to which the invention pertains upon reference to the following detailed description.

DESCRIPTION OF THE DRAWINGS

The description refers to the accompanying drawings in which like reference characters refer to like parts throughout the several views and in which:

FIG. 1 is an exploded view of a fluid filter illustrating the preferred embodiment of the invention;

FIG. 2 is a plan view of the preferred filter of FIG. 1 shown in assembled form;

FIG. 3 is an enlarged sectional view taken along lines 3—3 of FIG. 2;

FIG. 4 is an enlarged fragmentary perspective view showing a companion pair of J-shaped clips joined by a C-shaped retainer clip; and FIG. 5 is an enlarged fragmentary view of a preferred magnet means.

DESCRIPTION OF THE PREFERRED EMBODIMENT

Now referring to the drawings, the preferred fluid filter comprises frame means which include a pair of spaced parallel frame sides 10 and 12 joined together by corrugated, perforated, rigid support plate 14. The frame sides 10 and 12 have a generally L-shaped cross section with the support plate 14 being fixed as by welding to the lower sections of the sides 10 and 12. The corrugations of the support plate 14 extend at right angles to the sides 10 and 12 and have a developed width substantially corresponding to the length of the sides 10 and 12.

A pair of handle elements 16 attached to the frame side 10 provide means for transporting the fluid filter.

A pair of caps 18 and 20 are removably joined to the ends of the sides 10 and 12 by a series of elongated fastener means 22 which extend between the cap members 18 and 20 and provide means for drawing them together to form a rigid four sided frame. The caps 18 and 20 are similar to one another and include an end wall section 24 and a depending skirt 26 which form a socket for receiving the ends of the sides 10 and 12.

A pleated filter element 28 is disposed within the four sided frame and is preferably formed of any formable filtering media shaped into a pleated configuration. The pleats extend parallel to the sides 10 and 12 of the frame. The filter element 28 is substantially resilient so that when it is separated from the frame means, it can be unfolded in order to assist the user in removing foreign matter that has accumulated on the pleats.

The pleated element 28 has a pair of side edges 30 and 32 which are normally disposed in close proximity to the sides 10 and 12.

As can best be seen in FIGS. 1 and 3, the fastener means 22 each comprises a pair of threaded members 34 each mounted on the end caps and inter-connected by an elongated tubular element 36. The elements 36 each extend between a pair of pleats and function to maintain the pleats at their proper separation so that they do not become concentrated and thereby reduce the filtering effectiveness of the element. In addition to separating the pleats, fasteners 22 secure the end caps 18 and 24 to the sides 10 and 12 to form an integral unit.

An elongated clip 38 having a J-shaped cross-section is fixed along each of the side edges 30 and 32 of the filter element 28. A companion elongated clip 40 having a J-shaped cross-section is fixed to the opposed surfaces of the frame sides 10 and 12 with its free edge bent back toward its associated frame side. The shank portions of each companion pair of J-shaped clips lie in a substantially common plane as can best be seen in FIG. 3 with the bent portions in close proximity to one another.

A C-shaped clip 42 joins each pair of companion clips 38 and 40 with its opposed edges being received within the bight of the J-shaped clips. The C-shaped clips 42 thereby provide means for removably joining the side edges 30 and 32 of the filter element to the frame sides 12 and 10 of the frame means.

As can best be seen in FIG. 3, when the filter element 28 is joined to the frame means, its lower surface seats on the supporting plate 14 which provides means to maintain the filter element in position. The normal fluid flow through the filter element is in a direction generally perpendicular to the supporting plate 14 with the fluid flowing first through the filter element 28 and then through the supporting plate 14.

A plurality of magnet means 44 are mounted between the end caps 18 and 20 in a direction parallel to the pleats of the filter element 28. The magnet means are each mounted to the skirt portion 26 of the caps 18 and 20 by a clip 46 which is arranged so that when the end caps 18 and 20 are separated from the frame sides 10 and 12, the magnet means can also be separated as a unit from the other components of the filter element. Each of the magnet means 44 comprises a tubular retainer 48 having a sufficient length to span the distance between the caps 18 and 20. A series of magnets 50 are disposed within each tubular retainer 48, with each pair of the magnets 50 being separated by a non-magnetic spacer 52. The magnets 50 and spacers 52 are retained within the retainer 48 by a pair of end plugs 54 which seal the ends of the retainers 48. It has been found that this particular arrangement for mounting a plurality of magnets is effective in removing magnetically attractive foreign material from the fluid system in which the preferred filter is disposed.

It is to be understood that I have described an improved filter cartridge having a pleated filter element removably attached to a frame means so that the filter element can be easily and quickly separated from the frame means, cleaned, and then reunited with the frame. It is to be further understood that I have described an improved means for attaching the edge of a filter sheet to a frame section comprising a pair of J-shaped clips one of which is attached to the filter sheet and the other to the frame means and which are interconnected by a clip having a C-shaped cross section.

In addition I have described in detail an improved magnetic means for removing metallic particles and the like from the fluid system and which forms a removable part of the preferred filter cartridge.

What is claimed is:

1. A fluid filter, comprising
   (a) a substantially rectangular rigid perforated supporting plate formed into a corrugated cross section;
   (b) a pair of side frame members each joined on opposite sides of said supporting plate;
   (c) a J-shaped clip fixed to each of said side frame members, said J-shaped clips having a length substantially corresponding to the length of each of said side frame members;
   (d) a second pair of side frame members, each of said members having portions for engaging the ends of said first mentioned pair of side members to form a four sided rectangular frame;
   (e) a plurality of elongated fastener means connecting said second pair of side members and operable to draw said second pair of said members toward one another;
   (f) a porous filter sheet formed into a series of parallel pleats between a pair of opposite side edges;
   (g) a second pair of J-shaped clips joined to the opposite side edges of said filter element, each of said second pair of J-shaped clips having a length substantially corresponding to said first mentioned J-shaped clips and being disposed in close proximity thereto;
   (h) a C-shaped clip engaging each companion pair of J-shaped clips; and
   (i) magnet means supported by said frame members, said magnet means comprising a tubular member mounted to a pair of opposite frame members and in parallel relationship to the pleats of said filter element and a series of magnets disposed in said tubular member, each pair of said magnets being separated by a non-magnetic spacer.

2. A fluid filter comprising:
   (a) a pair of frame members and means positioning said frame members in a spaced relationship:
   (b) each of said frame members having a flange member extending along the length of the frame members, said flanged members being on the side of said frame members facing the other of said frame members and each having a flange portion spaced outwardly from the frame member to define a longitudinal slot between the frame member and the flange portion;
   (c) a substantially rectangular filter element adapted to be disposed between said frame members, said frame members having means extending toward one another and providing support for said filter element;
   (d) said filter having flanged members disposed along opposite edges substantially coinciding with the flanged members carried by said frame members;
   (e) said filter element flanged members each having a flange portion formed in a direction away from said frame member flange portions and spaced away from said filter element to define a slot between said filter element and said flange portion whereby positioning said filter element flanged members adjacent said frame member flanged members positions said flange portions extending away from each other, and
   (f) a pair of clip members each having opposed inwardly extending flanges to be received in the slots formed beneath said flange portions and upon being slid along said flanged members locking one to the other to thereby lock said filter element to said frame members.

3. A fluid filter as defined in claim 2 wherein said positioning means include:
(a) a perforated, rigid supporting plate, said frame members being joined to opposite sides of said supporting plate in spaced parallel relationship; and
(b) an elongated cap member separably engaged with each pair of ends of said frame members to form a four-sided frame.

4. A fluid filter as defined in claim 3, wherein said filter element has a plurality of pleats, said elongated cap members are disposed at right angles to the pleats of said filter element and including a plurality of spaced elongated members having their opposite ends mounted on said cap members and their midsections extending within the pleats of said filter element, and maintaining said pleats in spaced relationship.

5. A fluid filter as defined in claim 4, including magnet means supported by said frame and arranged to separate magnetically attractive particles from a fluid passing through said filter element.

6. A fluid filter as defined in claim 4, including an elongated tubular member supported between opposite sides of said frame and a series of magnets disposed in a longitudinal series within said tubular member, and a nonmagnetic spacer disposed between each pair of magnets.

7. A fluid filter as defined in claim 6, including handle means attached to said frame members.

8. A fluid filter as defined in claim 4 wherein said supporting plate has a series of longitudinally extending corrugations extending from opposite side edges of said supporting plate and in parallel relationship to said end caps.

References Cited
UNITED STATES PATENTS

| | | | |
|---|---|---|---|
| 2,413,954 | 1/1947 | Conterman | 210—451 |
| 2,814,355 | 11/1957 | Powers. | |
| 3,288,296 | 11/1966 | Hirs | 210—232 |
| 3,206,657 | 9/1965 | Morlya | 210—222 |

OTHER REFERENCES

Advertisement in "Business Magazine of Sheet Metal Work," 92 Martling Ave., Tarrytown, N.Y., p. 121, April 1953.

REUBEN FRIEDMAN, Primary Examiner

T. A. GRANGER, Assistant Examiner

U.S. Cl. X.R.

210—236, 493